United States Patent
Coffinberry

(10) Patent No.: US 8,266,889 B2
(45) Date of Patent: Sep. 18, 2012

(54) GAS TURBINE ENGINE FAN BLEED HEAT EXCHANGER SYSTEM

(75) Inventor: George Albert Coffinberry, West Chester, OH (US)

(73) Assignee: General Electric Company, Schenectady, NY (US)

( * ) Notice: Subject to any disclaimer, the term of this patent is extended or adjusted under 35 U.S.C. 154(b) by 1024 days.

(21) Appl. No.: 12/240,359

(22) Filed: Sep. 29, 2008

(65) Prior Publication Data

US 2010/0043396 A1 Feb. 25, 2010

Related U.S. Application Data

(60) Provisional application No. 61/091,553, filed on Aug. 25, 2008.

(51) Int. Cl.
*F02K 99/00* (2009.01)
(52) U.S. Cl. .......... 60/267; 60/226.1; 60/782; 60/39.83
(58) Field of Classification Search .......... 60/266, 60/267, 782, 785, 39.08, 226.1, 262, 736, 60/39.83; 137/15.1, 15.2; 244/53 B
See application file for complete search history.

(56) References Cited

U.S. PATENT DOCUMENTS

| | | | | | |
|---|---|---|---|---|---|
| 3,842,597 | A | * | 10/1974 | Ehrich | 60/226.1 |
| 4,041,697 | A | * | 8/1977 | Coffinberry et al. | 60/39.281 |
| 4,104,873 | A | * | 8/1978 | Coffinberry | 60/39.281 |
| 4,170,873 | A | * | 10/1979 | Milo | 60/39.08 |
| 4,254,618 | A | | 3/1981 | Elovic | |
| 4,645,415 | A | * | 2/1987 | Hovan et al. | 415/115 |
| 4,782,658 | A | * | 11/1988 | Perry | 60/226.1 |
| 4,791,782 | A | * | 12/1988 | Seed | 60/226.1 |
| 4,914,904 | A | * | 4/1990 | Parnes et al. | 60/226.1 |
| 5,123,242 | A | * | 6/1992 | Miller | 60/226.1 |
| 5,125,597 | A | * | 6/1992 | Coffinberry | 244/118.5 |
| 5,137,230 | A | * | 8/1992 | Coffinberry | 244/118.5 |
| 5,203,163 | A | * | 4/1993 | Parsons | 60/226.1 |
| 5,269,135 | A | | 12/1993 | Vermejan et al. | |
| 5,305,616 | A | * | 4/1994 | Coffinberry | 62/402 |
| 5,357,742 | A | * | 10/1994 | Miller | 60/785 |
| 5,363,641 | A | * | 11/1994 | Dixon et al. | 60/778 |
| 5,431,533 | A | * | 7/1995 | Hobbs | 415/58.7 |
| 5,452,573 | A | * | 9/1995 | Glickstein et al. | 60/782 |
| 5,586,859 | A | * | 12/1996 | Nolcheff | 415/58.5 |
| 5,607,284 | A | * | 3/1997 | Byrne et al. | 415/58.5 |
| 5,729,969 | A | * | 3/1998 | Porte | 60/226.1 |
| 5,782,077 | A | * | 7/1998 | Porte | 60/782 |
| 6,883,302 | B2 | | 4/2005 | Koshoffer | |
| 7,213,391 | B2 | * | 5/2007 | Jones | 60/226.1 |
| 7,631,483 | B2 | * | 12/2009 | Mani et al. | 60/226.1 |
| 7,716,913 | B2 | * | 5/2010 | Rolt | 60/266 |
| 7,748,211 | B2 | * | 7/2010 | Norris et al. | 60/247 |
| 7,810,312 | B2 | * | 10/2010 | Stretton et al. | 60/266 |
| 7,861,512 | B2 | * | 1/2011 | Olver et al. | 60/226.1 |
| 7,926,261 | B2 | * | 4/2011 | Porte | 60/266 |
| 7,946,806 | B2 | * | 5/2011 | Murphy | 415/145 |
| 7,966,831 | B2 | * | 6/2011 | Kraft et al. | 60/785 |
| 8,024,935 | B2 | * | 9/2011 | Hoover et al. | 60/785 |
| 2010/0139288 | A1 | * | 6/2010 | Rago | 60/785 |
| 2010/0242492 | A1 | * | 9/2010 | Sloat et al. | 60/793 |

* cited by examiner

*Primary Examiner* — William H Rodriguez
(74) *Attorney, Agent, or Firm* — David J. Clement; Trego, Hines & Ladenheim, PLLC

(57) ABSTRACT

A heat exchanger system for a gas turbine engine includes: (a) a fan having at least two stages of rotating fan blades surrounded by a fan casing, the fan operable to produce a flow of pressurized air at a fan exit; (b) at least one heat exchanger having a first flowpath in fluid communication with the fan at a location upstream of the fan exit; and (c) a fluid system coupled to a second flowpath of the at least one heat exchanger. The first and second flowpaths are thermally coupled to each other.

13 Claims, 6 Drawing Sheets

GAS TURBINE ENGINE FAN BLEED HEAT EXCHANGER SYSTEM

CROSS-REFERENCE TO RELATED APPLICATIONS

This application claims the benefit of Provisional Patent Application Ser. No. 61/091,553 filed Aug. 25, 2008.

BACKGROUND OF THE INVENTION

This invention relates generally to gas turbine engines and methods for oil cooling in such engines.

Gas turbine engines are commonly provided with a circulating oil system for lubricating and cooling various engine components such as bearings, gearboxes, and the like. In operation the oil absorbs a substantial amount of heat that must be rejected to the environment in order to maintain the oil at acceptable temperatures. Commonly, the oil is circulated through an oil-to-fuel heat exchanger where heat from the oil is rejected to the fuel, which acts as a heat sink. The fuel is subsequently injected into the engine's combustor and burned.

In many operating conditions, aircraft gas turbine engines have more oil heat load than heat sink from the fuel which will be burnt in the engine. The typical solution to this is to either cool engine fuel or engine oil with engine fan air, or to pump fuel through the oil-to-fuel heat exchanger at a higher rate than required for combustion, with the excess fuel flow being recirculated from the engine back to the aircraft fuel tanks. Low-bypass military turbofan engines have too many fan stages (typically three) to make fan air cooling a viable solution, because the fan duct discharge air is too hot. Therefore, tank recirculation is used.

FIG. 1 depicts an example of a prior art aircraft gas turbine engine 10 with a fuel tank recirculation system. The engine 10 has a fan 12, a high pressure compressor 14, a combustor 16, a high pressure turbine 18, and a low pressure turbine 20, all arranged in a serial, axial flow relationship. The engine 10 is operable to generate a core flow of exhaust gases as well as a bypass flow in a conventional manner. In the illustrated example, the engine 10 is a low-bypass turbofan in which a portion of the flow from the fan 12 is directed around the core in a bypass duct 22. The bypass flow and the core flow both exit into an afterburner duct 24 which has an afterburner flameholder 26 disposed at its upstream end.

A fuel-to-oil heat exchanger 28 is coupled to the lubrication system 30 of the engine 10. A feed pump 32 pumps fuel from the tanks 34 of the aircraft (not shown) through the fuel-to-oil heat exchanger 28 where it absorbs heat from the oil. The fuel then passes downstream where it is metered into the combustor 16 and burned. In many cases the heat load required to be rejected from the oil is greater than the heat sink capacity of the fuel at the required fuel flow for the engine operating condition. For example, this can occur when the oil is at a high temperature and the fuel flow is low (e.g. flight idle). Accordingly, to get sufficient cooling, fuel is supplied to the fuel-to-oil heat exchanger 28 at the required rate for cooling, then the excess above that needed for engine operation is routed back to the tanks 34.

During ground idle the fuel in the tanks 34 may become very hot and it may become necessary to use ground support equipment to cool the fuel. During flight, tank fuel temperature increases at an ever increasing rate as the tanks 34 become near empty. Furthermore, this raises the temperature of the fuel as subsequently supplied to the engine 10. The engine 10 may have limits on the acceptable input fuel temperature. For example, the fuel may be needed at a relatively low temperature for cooling a full authority digital engine control (FADEC) or other electronics.

BRIEF SUMMARY OF THE INVENTION

These and other shortcomings of the prior art are addressed by the present invention, which provides a method and apparatus for using fan bleed air to cool oil in a gas turbine engine.

According to one aspect of the invention, a heat exchanger system for a gas turbine engine includes: (a) a fan having at least two stages of rotating fan blades surrounded by a fan casing, the fan operable to produce a flow of pressurized air at a fan exit; (b) at least one heat exchanger having a first flowpath in fluid communication with the fan at a location upstream of the fan exit; and (c) a fluid system coupled to a second flowpath of the at least one heat exchanger. The first and second flowpaths are thermally coupled to each other.

According to another aspect of the invention, a gas turbine engine includes: (a) a fan having at least two stages of rotating fan blades surrounded by a fan casing, the fan operable to produce a flow of pressurized air at a fan exit; (b) a heat exchanger having a first flowpath in fluid communication with the fan upstream of the fan exit; (c) at least one heat source disposed in the engine remote from the heat exchanger; and; (d) a fluid circuit coupled between the at least one heat source and a second flowpath of the heat exchanger, and operable to circulate a working fluid therebetween. The first and second flowpaths are thermally coupled within the heat exchanger.

BRIEF DESCRIPTION OF THE DRAWINGS

The invention may be best understood by reference to the following description taken in conjunction with the accompanying drawing figures in which.

DETAILED DESCRIPTION OF THE INVENTION

Figure 1:
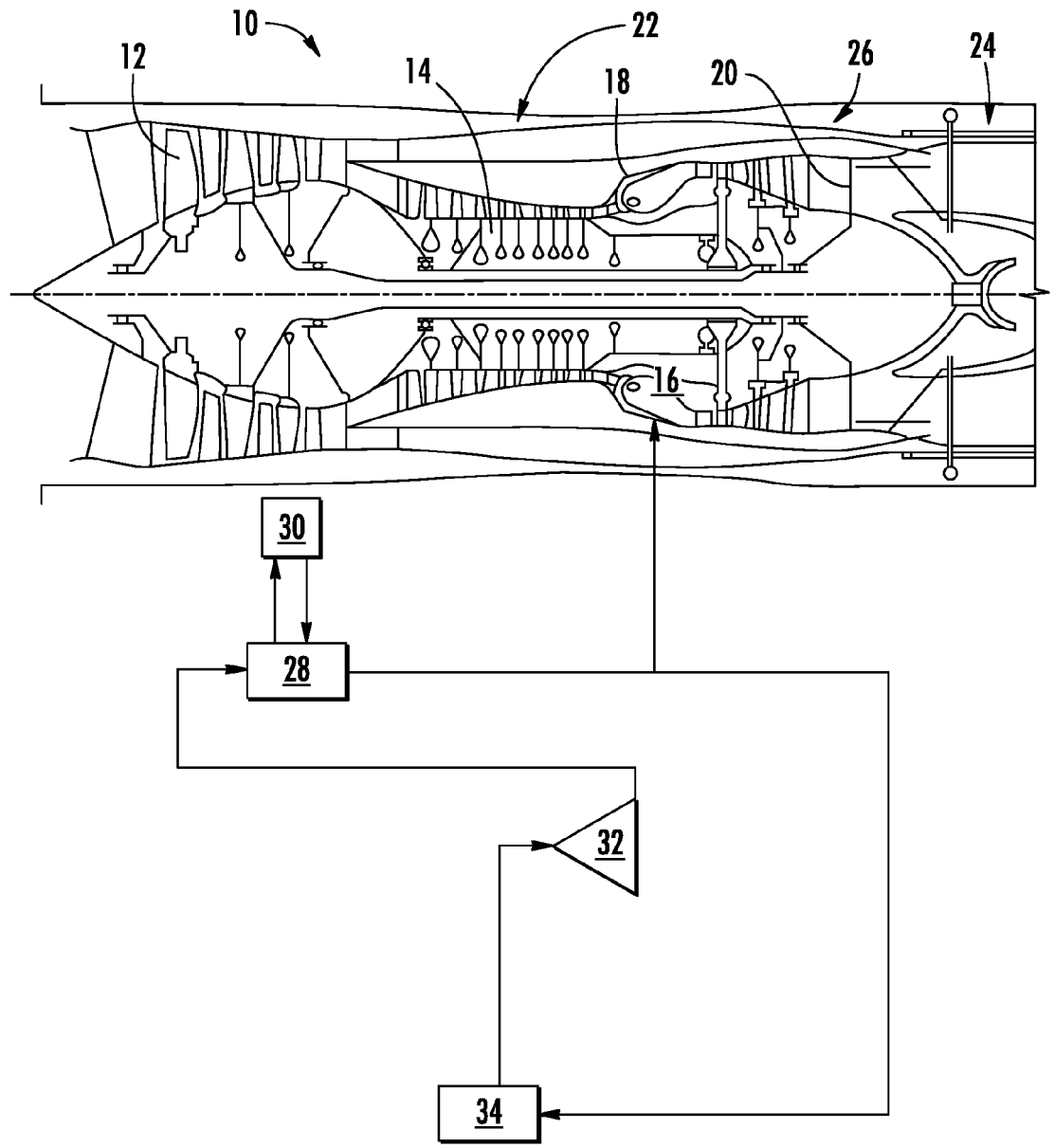
FIG. 1 is a schematic view of a gas turbine engine incorporating a prior art heat exchanger system.
Figure 2:
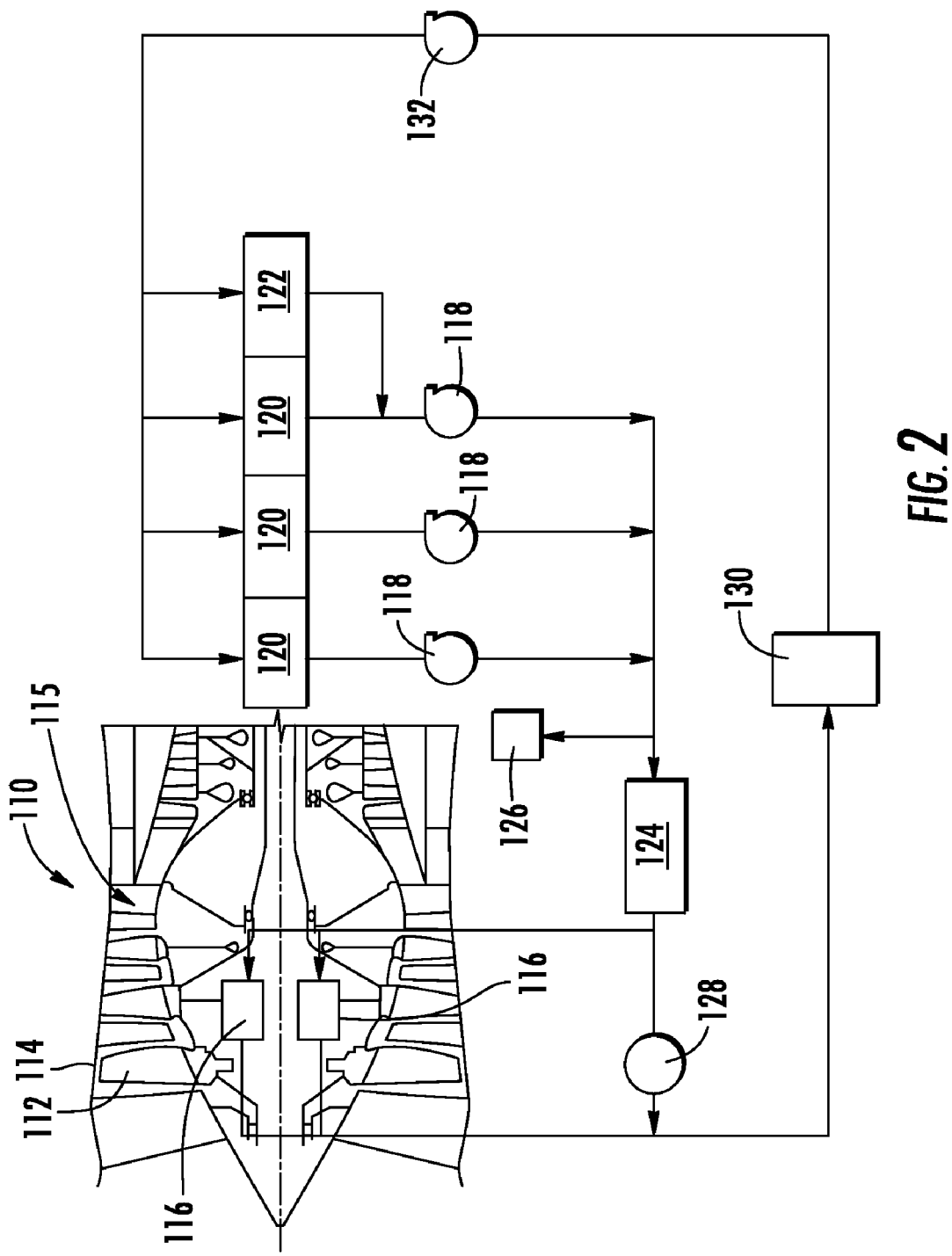
FIG. 2 is a schematic view of a gas turbine engine incorporating a heat exchanger system constructed according to an aspect of the present invention.

Referring to the drawings wherein identical reference numerals denote the same elements throughout the various views, FIG. 2 depicts an exemplary gas turbine engine 110 incorporating a fan bleed heat transfer system constructed in accordance with an aspect of the present invention. The basic engine 110 is a low-bypass turbofan configuration substantially similar in construction to the engine 10 described above. For illustrative clarity only the three-stage fan 112 and the fan casing 114 are shown in detail. The fan 112 discharges pressurized air to the downstream compressor at a fan exit 115.

One or more bleed air heat exchangers 116 are mounted to the fan casing 114 in close proximity to the fan 112. The heat exchangers are of the air-to-liquid type and are as described in more detail below. Scavenge pumps 118 are provided which remove heated oil from sumps 120 and a gearbox 122 of the engine 110 and pump it to an oil tank 124, after removal of air in an air/oil separator 126. While the sumps 120 and gearbox 122 are commonly found in gas turbine engines, oil or another liquid could also be used to remove heat from any other heat source within the engine 110.

The hot engine scavenge oil flows from the oil tank 124 to the bleed air heat exchangers 116 where heat is removed from the oil. A bypass valve 128 is provided to assure continuous oil flow in the oil system in the event oil congeals in the bleed air heat exchanger 116 (for example, due to exceptionally cold fan bleed air passing through the bleed air heat exchanger 116).

The fan bleed air is used to cool the engine oil. As shown in FIG. 2, the engine oil may be used directly as the liquid-side working fluid for the fan bleed heat exchangers 116. Optionally another fluid, such as fuel or a water-glycol mixture, may be used as an intermediate medium to transfer heat from the engine oil to the bleed air heat exchanger 116.

After exiting the bleed air heat exchangers 116, the oil may pass through a conventional oil-to-fuel heat exchanger 130 where, depending on operating conditions, heat is transferred from the oil to the fuel, or from the fuel to the oil. The oil is then returned to the sumps 120 and gearbox 122 by a supply pump 132.

Figure 3:
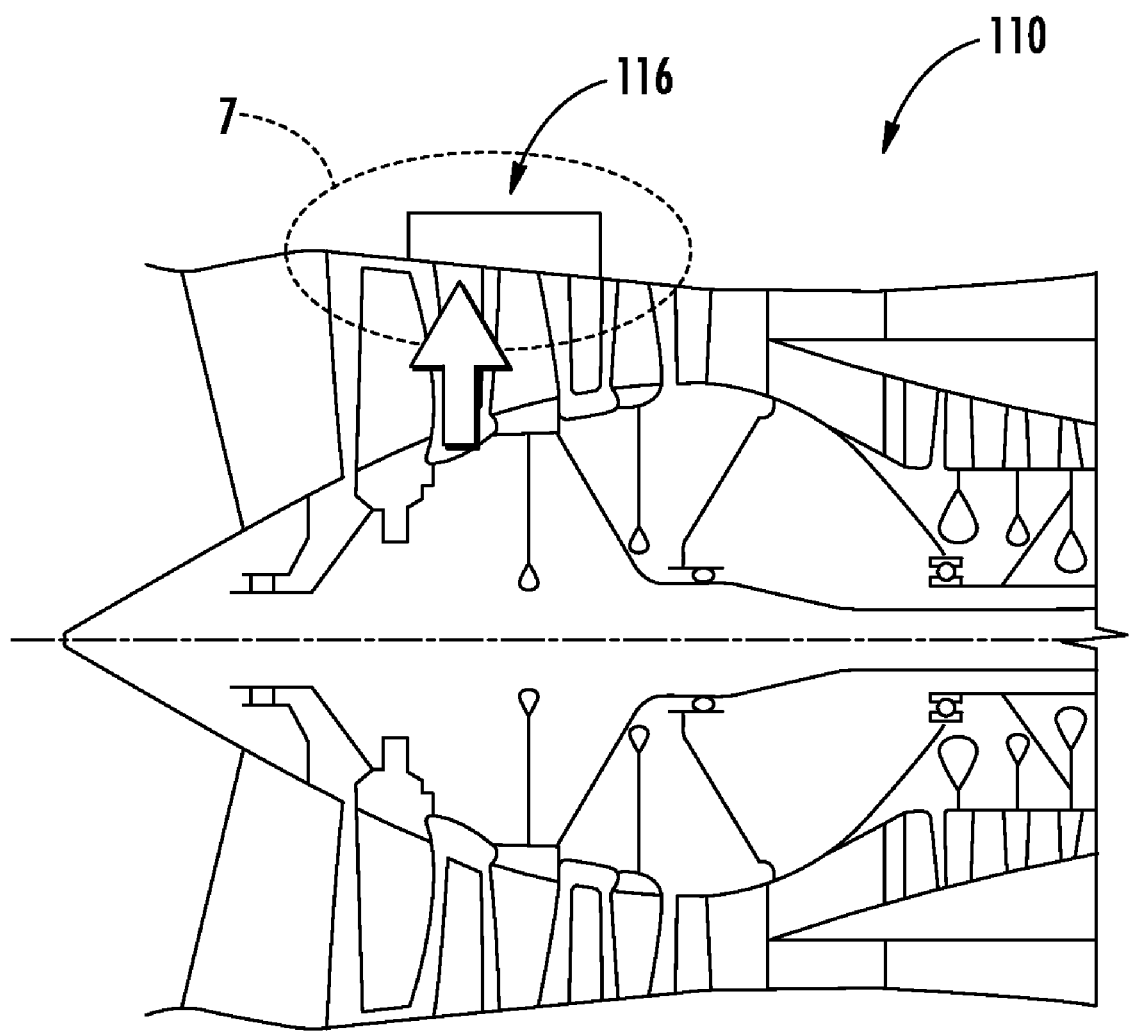
FIG. 3 is cross-sectional view of a portion of the fan section of the engine shown in FIG. 2, having a heat exchanger mounted thereto.

FIG. 3 is a side view of the engine 110 showing the location of the bleed air heat exchanger 116. The bleed air heat exchanger 116 is mounted to the exterior of the fan casing 114 and is positioned to receive airflow bled from the fan 112 upstream of the fan exit 115, as shown generally by the large arrow. For illustrative purposes only a single bleed air heat exchanger 116 is shown, but it will be understood that a plurality of them could be positioned around the periphery of the fan casing 114.

Figure 4:
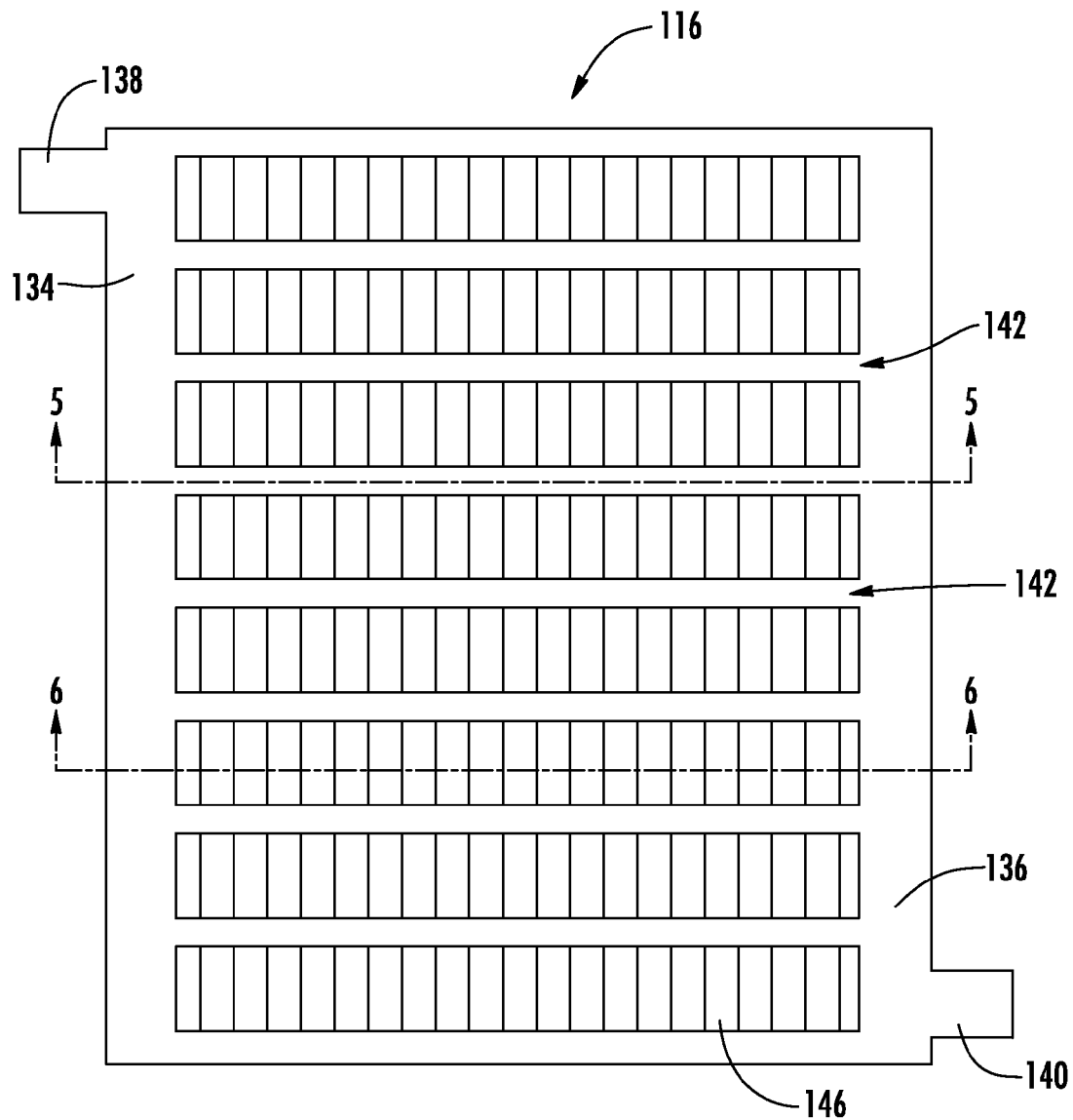
FIG. 4 is a plan view of the heat exchanger of FIG. 3.
Figure 5:
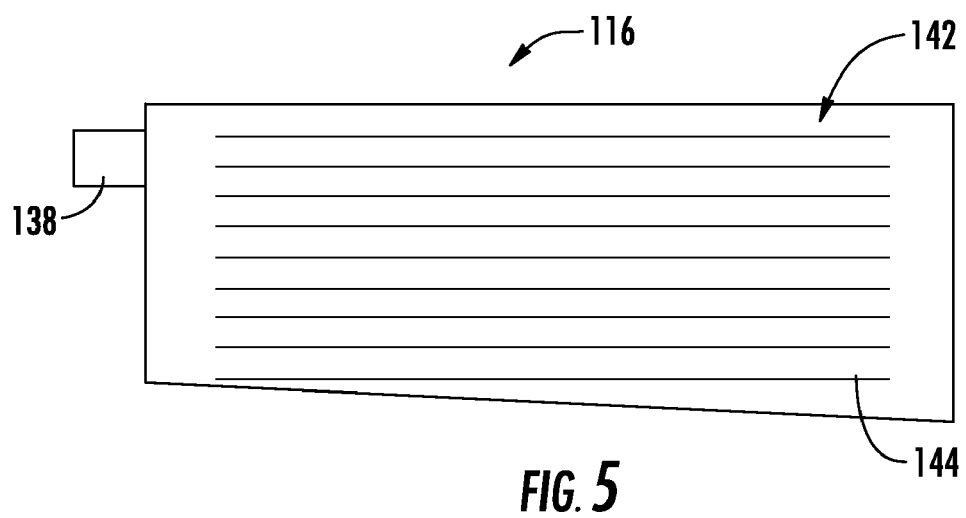
FIG. 5 is a view taken along lines 5-5 of FIG. 4.
Figure 6:
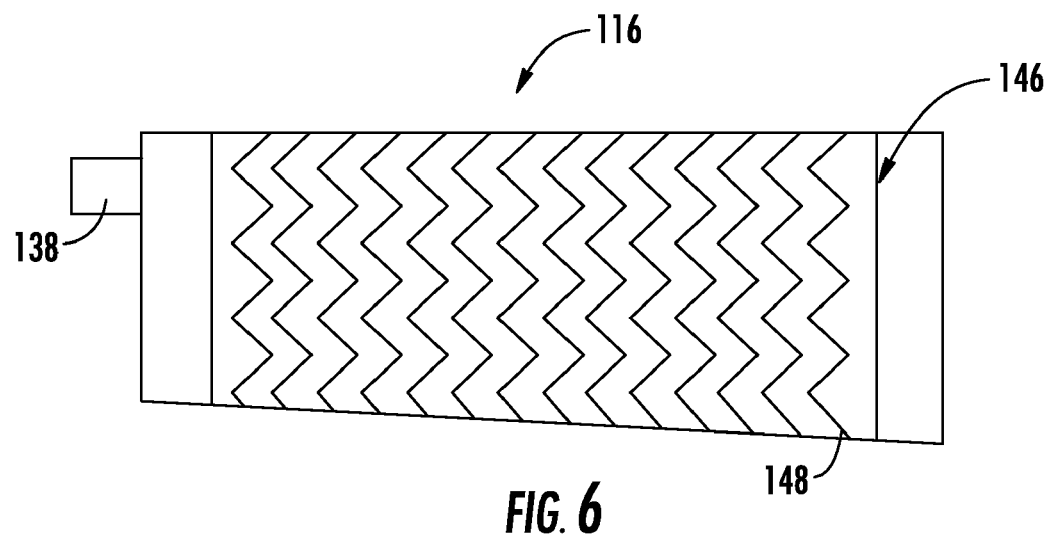
FIG. 6 is a view taken along lines 6-6 of FIG. 4.

FIGS. 4-6 illustrate the bleed air heat exchanger 116 in more detail. It is an air-to liquid configuration and has fore and aft plenums 134 and 136 including an inlet 138 and an outlet 140, respectively. The plenums 134 and 136 communicate with a series of parallel liquid channels 142, which may include fins 144 (see FIG. 5) or other heat transfer enhancements. The liquid channels 142 are separated by air channels 146 which may also include fins 148 (see FIG. 6) or other heat transfer enhancements. Within the bleed air heat exchanger 116, the liquid channels 142 constitute a first flowpath and the air channels 146 constitute a second flowpath. As with all heat exchangers, the two flowpaths are mutually thermally coupled, that is, they are arranged such that heat energy can flow from one flowpath to the other.

Figure 7:
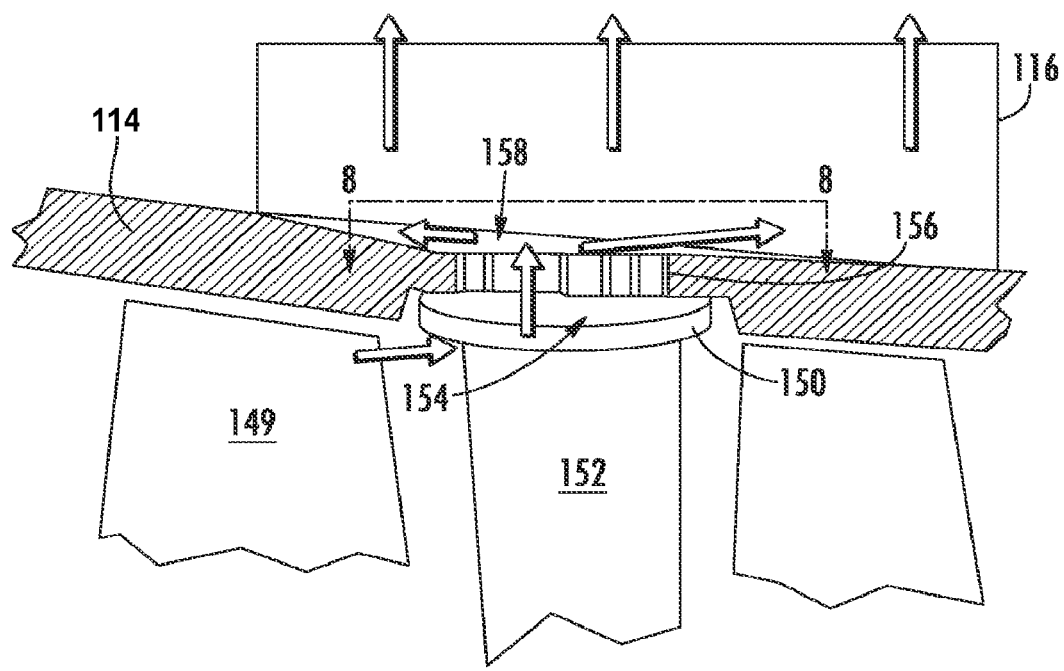
FIG. 7 is an enlarged view of a portion of FIG. 3.
Figure 8:
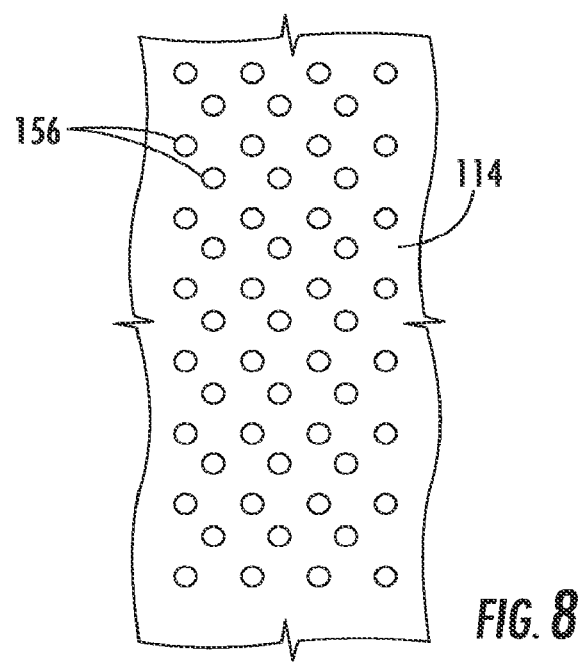
FIG. 8 is a view taken along lines 8-8 of FIG. 7.

FIG. 7 illustrates the bleed air flow path. As shown by the solid arrows, air discharged from the fan first stage blades 149 passes aft and radially outboard past the outer platforms 150 of the second stage vanes 152, through existing gaps between the periphery of the outer platforms 150 and the fan casing 114. A radial gap 154 between the outer platforms 150 and the fan casing 114 allows air flow in a circumferential direction. The air then bleeds through the fan casing 114 through one or more bleed apertures 156. The number, shape, size, and position of the bleed apertures 156 may be selected in a known manner to permit adequate mass air flow to the bleed air heat exchanger 116 with an acceptable pressure loss, and to throttle the bleed flow to prevent excessive loss from the fan air flow. A plenum 158 may be provided between the fan casing 114 and the bleed air heat exchanger 116 to permit fore-and-aft air flow. Depending on the specific engine and fan configuration it may be possible to bleed air from another stage of the fan 112.

While the air temperature at the tip of the fan first stage blades 149 is relatively low and thus suitable for cooling, the air discharge pressure is quite small, and only the static pressure is available for bleed air cooling. The available heat exchanger air pressure drop is the blade tip discharge pressure less the pressure drop through the second stage vane outer platforms 150, the bleed apertures 156 and the bleed air heat exchanger 116, minus the fan cowl static pressure outside the bleed air heat exchanger 116 (which is essentially ambient pressure). In order to obtain adequate air side heat transfer with this very low pressure drop, the bleed air heat exchanger 116 uses a large ratio of air frontal face area to air flow depth (i.e. radial thickness). A secondary advantage of this configuration is that hot air from the bleed air heat exchanger 116 is directed radially outboard, away from temperature-sensitive components such as electrical cables.

With proper selection of the various components described above the total heat sink available in the bleed air and the fuel scheduled for combustion will be equal to or greater than the heat load required to keep the oil at an acceptable temperature. Therefore, no heat will be transferred to the aircraft tanks in the form of heated, recirculated fuel. This includes the most critical operating conditions where combustion fuel flow is low, for example, ground idle, cruise, and flight idle conditions. Furthermore, in some flight conditions, the bleed air heat exchanger 116 not only dissipates heat which would otherwise return to the tanks, it also cools the engine fuel at several flight conditions (negative fuel-oil heat exchanger heat transfer) thus providing lower fuel temperature to the engine fuel nozzles with less likelihood for nozzle fuel coking.

The foregoing has described a heat exchanger for a gas turbine engine and a method for its operation. While specific embodiments of the present invention have been described, it will be apparent to those skilled in the art that various modifications thereto can be made without departing from the spirit and scope of the invention. Accordingly, the foregoing description of the preferred embodiment of the invention and the best mode for practicing the invention are provided for the purpose of illustration only.

What is claimed is:

1. A heat exchanger system for a gas turbine engine comprising:
    a fan comprising at least two stages of rotating fan blades surrounded by a fan casing, the fan operable to produce a flow of pressurized air at a fan exit;
    at least one heat exchanger having a first flowpath in fluid communication with the fan at a location upstream of the fan exit, wherein the fan casing includes at least one bleed aperture passing therethrough which communicates with the heat exchanger; and
    a fluid system coupled to a second flowpath of the at least one heat exchanger; wherein the first and second flowpaths are thermally coupled to each other; and
    wherein the fan further comprises an annular array of stationary vanes each having a platform disposed at its outer end, and wherein a radial gap is defined between each of the platforms and the fan casing, the bleed apertures being positioned within an axial extent of the radial gap.

2. The heat exchanger system of claim 1 wherein the at least one heat exchanger is mounted to an exterior of the fan casing.

3. The heat exchanger system of claim 2 wherein an outer surface of the fan casing has an annular plenum formed therein, the plenum disposed between the fan casing and the heat exchanger.

4. The heat exchanger system of claim 1 wherein the fan comprises three stages of rotating fan blades, and the heat exchanger communicates with the first stage of fan blades.

5. A gas turbine engine comprising:
- a fan comprising at least two stages of rotating fan blades surrounded by a fan casing, the fan operable to produce a flow of pressurized air at a fan exit;
- a heat exchanger having a first flowpath in fluid communication with the fan upstream of the fan exit, wherein the fan casing includes at least one bleed aperture passing therethrough which communicates with the heat exchanger;
- at least one heat source disposed in the engine remote from the heat exchanger; and;
- a fluid circuit coupled between the heat source and a second flowpath of the heat exchanger, and operable to circulate a working fluid therebetween, wherein the first and second flowpaths are thermally coupled within the heat exchanger; and
- wherein the fan further comprises an annular array of stationary vanes each having a platform disposed at its outer end, and wherein a radial gap is defined between each of the platforms and the fan casing, the bleed apertures being positioned within an axial extent of the radial gap.

6. The gas turbine engine of claim 5 wherein the heat source is a bearing sump and the working fluid is lubricating oil.

7. The gas turbine engine of claim 6 further comprising at least one scavenge pump disposed between the bearing sump and the heat exchanger.

8. The gas turbine engine of claim 7 further comprising at least one oil tank disposed between the scavenge pump and the heat exchanger.

9. The gas turbine engine of claim 8 further comprising a bypass valve disposed between the at least one oil tank and the heat exchanger.

10. The gas turbine engine of claim 6 further comprising at least one supply pump disposed between the heat exchanger and located upstream of the at least one bearing sump.

11. The gas turbine engine of claim 5 wherein the at least one heat exchanger is mounted to an exterior of the fan casing.

12. The gas turbine engine of claim 11 wherein an outer surface of the fan casing has an annular plenum formed therein, the plenum disposed between the fan casing and the heat exchanger.

13. The gas turbine engine of claim 5 wherein the fan comprises three stages of rotating fan blades, and the heat exchanger communicates with the first stage of fan blades.

* * * * *